US006868463B1

(12) United States Patent
Jung et al.

(10) Patent No.: US 6,868,463 B1
(45) Date of Patent: Mar. 15, 2005

(54) AUDIO DATA RECORDING APPARATUS AND AUDIO DATA SENDING/RECEIVING METHOD OF THE APPARATUS

(75) Inventors: Won Geun Jung, Kyunggi-do (KR); Seung Il Baik, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 519 days.

(21) Appl. No.: 09/617,049

(22) Filed: Jul. 14, 2000

(30) Foreign Application Priority Data

Jul. 14, 1999 (KR) ........................................ 1999-28377

(51) Int. Cl.⁷ ............................................ G06F 13/00
(52) U.S. Cl. ....................... 710/100; 710/66; 710/69; 710/70; 710/71; 710/105; 369/17; 369/47.35
(58) Field of Search ............................. 710/62–71, 100, 710/105; 369/17, 47.1–47.55

(56) References Cited

U.S. PATENT DOCUMENTS

| | | | | |
|---|---|---|---|---|
| 4,617,599 A | * | 10/1986 | Noguchi et al. | 360/32 |
| 5,365,467 A | * | 11/1994 | Fujita et al. | 708/290 |
| 5,953,513 A | * | 9/1999 | Saiki et al. | 710/62 |
| 5,968,141 A | * | 10/1999 | Tsai | 710/14 |
| 5,999,505 A | * | 12/1999 | Yasui | 369/47.31 |
| 6,091,686 A | * | 7/2000 | Caffarelli et al. | 369/53.24 |
| 6,263,154 B1 | * | 7/2001 | Scheffler | 386/96 |
| 6,304,920 B1 | * | 10/2001 | Kobayashi et al. | 710/1 |
| 6,516,359 B1 | * | 2/2003 | Kurihara et al. | 710/52 |

* cited by examiner

*Primary Examiner*—Kim Huynh
*Assistant Examiner*—Mike Nguyen
(74) *Attorney, Agent, or Firm*—Birch, Stewart, Kolasch & Birch, LLP

(57) ABSTRACT

The apparatus and method for transferring audio data to a data recorder adopting a personal computer bus to receive audio data enters into data communication mode over a bus without conducting preparation steps for transferring data when a record request is received. The preparation steps include occupying the bus and issuing packet commands. Real-time data such as an audio signal are transferred with no delay to a general optical disk driver satisfying the personal computer (PC) bus interfacing requirement. This allows adoption of a general disk driver for data recording instead of an exclusive audio disk driver, thereby reducing manufacturing cost of a digital audio recorder and enabling the disk driver installed in a digital audio recorder to be used in other devices such as a PC.

18 Claims, 5 Drawing Sheets

[ATAPI BUS TRANSFER PROTOCOL]

*Conventional Art*

AUDIO DATA RECORDING APPARATUS AND AUDIO DATA SENDING/RECEIVING METHOD OF THE APPARATUS

BACKGROUND OF THE INVENTION

1. Field of the Invention

The present invention relates to an apparatus and method for transferring audio data to a data recorder using a personal computer bus to receive audio data.

2. Description of the Related Art

An optical disk driver for a rewritable optical disk such as a CD_RW uses the AT Attachment Packet Interface (ATAPI) bus standard developed for a personal computer (PC). Through the ATAPI bus, an optical disk driver receives data from other devices and records the received data on an optical disk.

The ATAPI protocol is a multi-to-multi device protocol, such that before a device connected to the bus transfers data through the bus, the device must conduct a preparation processes marked 'A' in FIG. 1. The preparation processes include bus busy checking, bus occupying, and entering into communication standby mode which require issuing and executing necessary packet commands. After the preparation processes are done, two devices connected to the bus can transfer data therebetween.

If an audio data recording/reproducing device uses a general optical disk driver adopting the ATAPI standard, the data to be recorded should be provided for the disk driver in accordance with the sequence diagram of FIG. 1. However, the above-explained preparation processes should be executed in advance for entering into a data communication mode in which data are effectively communicated between two devices, causing data transmission to be delayed. Therefore, the ATAPI standard has some disadvantages due to data transmission delays when applied in an audio data recorder in which audio data must be transferred with minimal delay.

Recently, in the field of ACDRs (Audio CD Recorders), an optical disk driver for consumer use has been developed. This optical disk driver has an exclusive audio channel for receiving audio signals and a channel protocol for the exclusive audio channel instead of adopting the ATAPI standard. The audio recording/reproducing device adopting the optical disk driver receives audio signals through the exclusive audio channel and then records them on an optical disk. Audio data in the optical disk driver is transferred as serial data. On the other hand, all data in the optical disk driver for a PC, e.g., a CD-RW are transferred as 16-bit bus data.

Therefore, the optical disk driver for consumer use cannot be used in a personal computer (PC) employing an ATAPI bus because the exclusive audio channel and the channel protocol of this optical disk driver are not compatible with the ATAPI standard used in a PC. Furthermore, for consumer use, the optical disk driver must be operated by user commands, not by commands from the PC.

Accordingly, the demand for such optical disk driver is much lower, and these optical drivers are more expensive than the widely popularized disk drivers using the ATAPI bus architecture. This causes an audio recording/reproducing device using such optical disk driver to be less cost competitive.

SUMMARY OF THE INVENTION

The present invention provides an audio data recording apparatus and audio data sending/receiving method for the apparatus which are capable of transferring inputted audio signals immediately on a transmission request without unnecessary preparation processes.

Further, the present invention provides an audio data recording apparatus for consumer use and audio data sending/receiving method thereof which are capable of transferring audio data through the ATAPI bus, such as CD-RW driver for PC.

The audio data receiving apparatus according to the present invention comprises a selecting means for selecting an audio signal source among a plurality of audio signal sources; a converting means for converting the selected audio signal into record-formatted audio data; and a connecting means for transferring the record-formatted audio data to a disk recording/reproducing device without passing through preparation steps for sending/receiving data when a record is requested through the disk recording/reproducing device, wherein the preparation steps are specified in the bus standard adopted in a personal computer.

The audio data sending/receiving method according to the present invention comprises the steps of entering into data communication mode without passing through preparation steps for transferring data when a record is requested, wherein the preparation steps include occupying the bus and entering into a communication standby mode which require issuing necessary packet commands and executing them; sending/receiving audio data in the data communication mode; escaping the data communication mode when a recording stop is requested; and interrupting the data transferring operation.

When a record command is received, an optical disk driver connected through said connecting means enters into the data communication mode directly without passing through the preparation steps, which are required to enter a communication standby mode, including bus occupation and packet command execution. Upon entering into the data communication mode, said converting means converts the audio data selected among a plurality of signal sources by said selecting means into record-formatted data, and said connecting means transmits the format-converted audio data to the optical disk driver with no delay in accordance with bus protocol adopted in a personal computer. The optical disk driver records the record-formatted audio data received from said connecting means on an optical disk.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings.

DETAILED DESCRIPTION OF THE PREFERRED EMBODIMENTS

In order that the invention may be more fully understood, preferred embodiments thereof will now be described with reference to the accompanying drawings.

Figure 1:
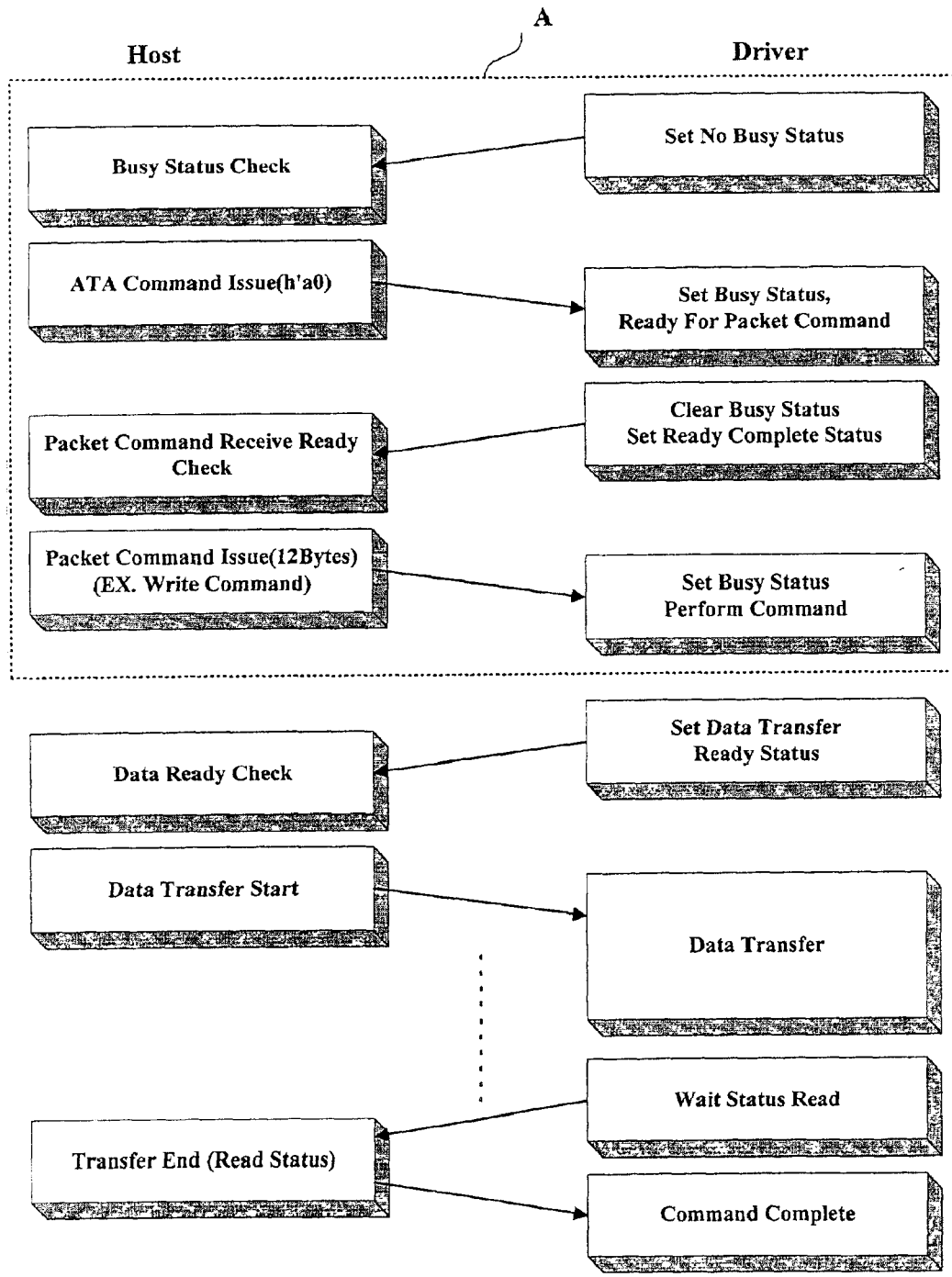
FIG. 1 is a simplified conventional data transfer protocol of the ATAPI bus between a host and an optical disk driver.
Figure 2:
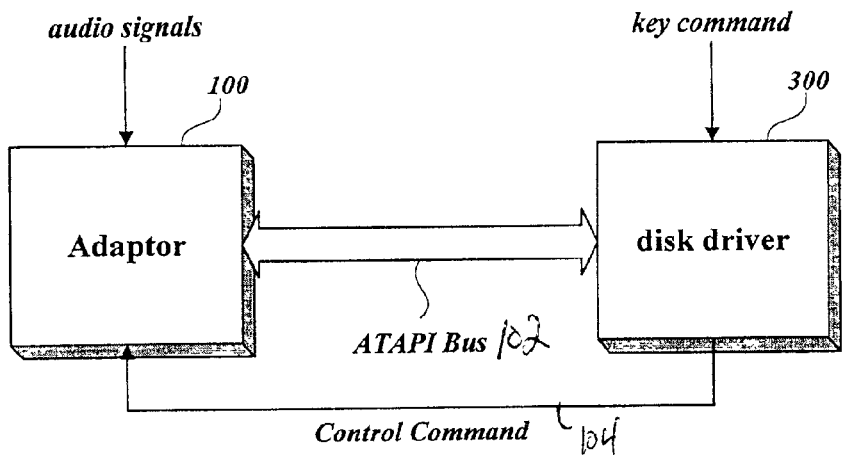
FIG. 2 is a simplified block diagram of an audio data recorder to; which a data sending/receiving method according to the present invention is applied.

FIG. 2 is a simplified block diagram of an audio data recorder to which a data sending/receiving method according to the present invention is applied. The audio data recorder of FIG. 2 comprises an adaptor 100 for converting inputted audio signals into data streams of a pre-determined audio recording format and transmitting the format-converted data streams through an Integrated Drive Electronics (IDE) or ATAPI bus 102 in accordance with transferring sequences compatible with the ATAPI protocol developed for the input/output (I/O) bus of a personal computer; and an optical disk driver 300 for commanding the audio data adapter 100 to enter into data communication mode immediately or to escape the mode when a record start or a stop key is entered via a command line 104, and recording audio data streams transferred from the audio data adaptor 100 through the IDE bus on an inserted optical disk.

Figure 3:
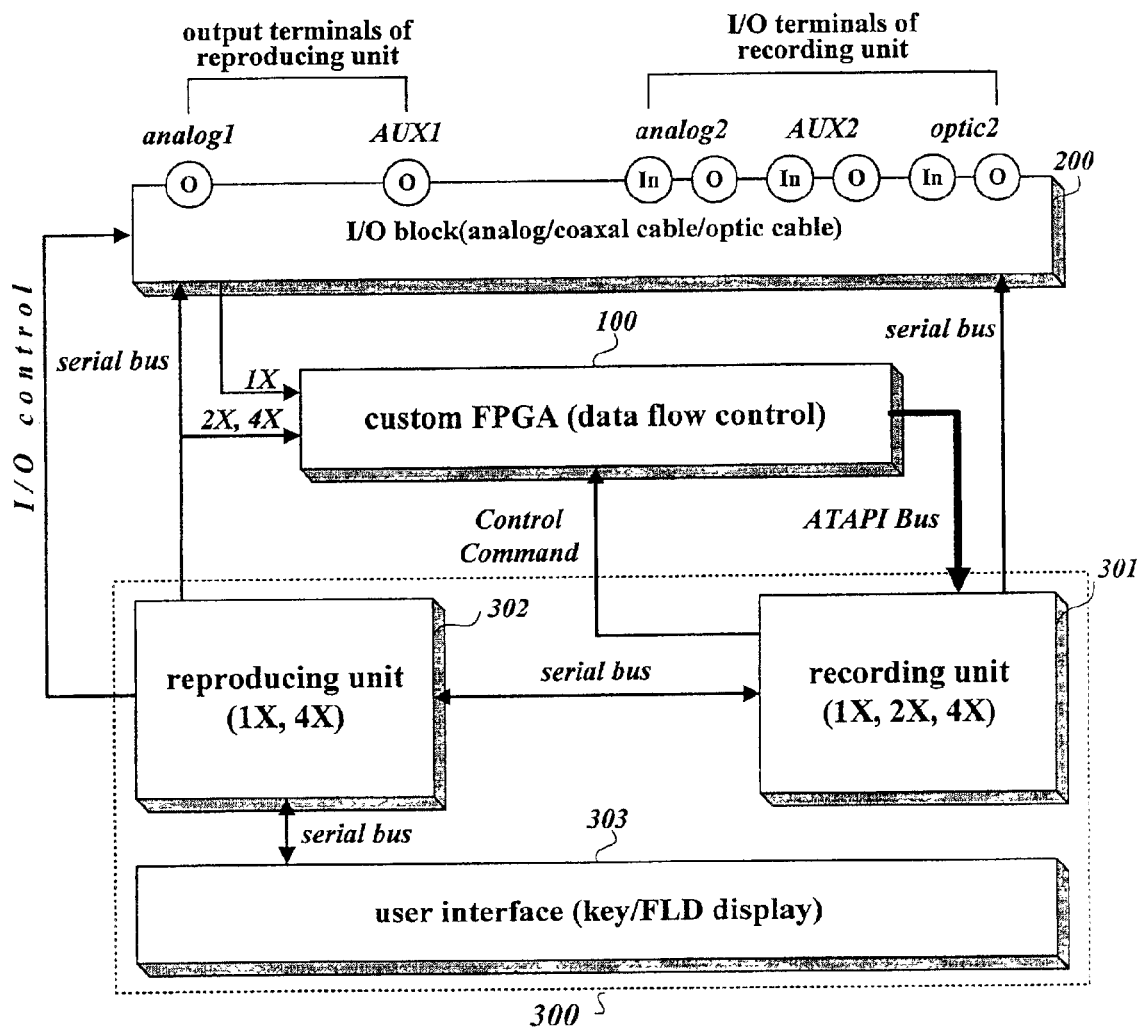
FIG. 3 shows the block diagram of FIG. 2 in more detail.

FIG. 3 shows the block diagram of FIG. 2 in more detail. The optical disk driver 300 and an I/O port 200, controlling input and output of audio signals, are depicted in FIG. 3. Specifically, the I/O port 200 is shown connected by serial buses and an I/O control line to the optical disk driver 300, and is shown connected to the adapter 100 by the serial bus. The disk driver 300 consists of a recording unit 301; a reproducing unit 302; and an user interface 303.

Figure 4:
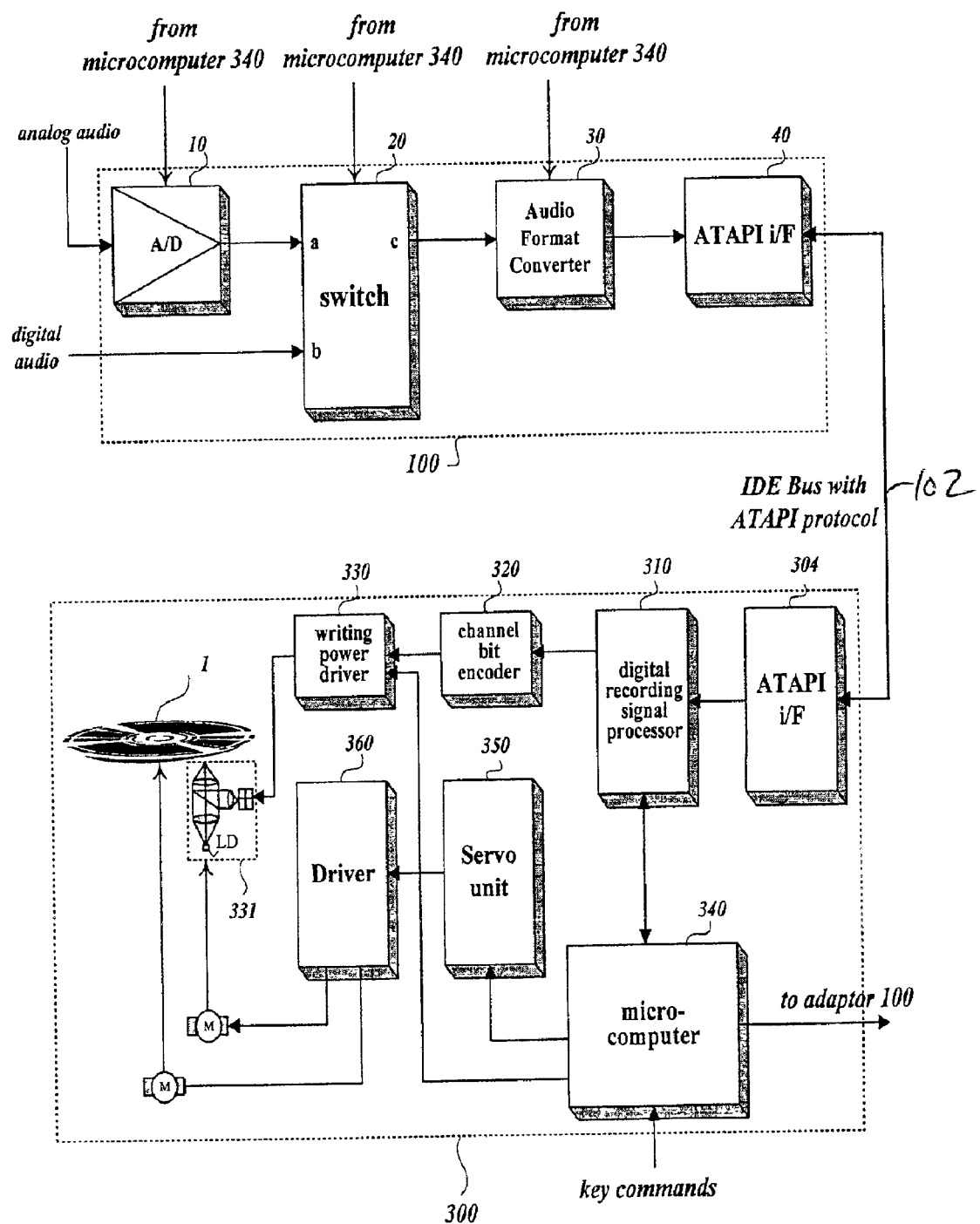
FIG. 4 shows the block diagram of an audio data adaptor and the recording part of an optical disk driver.

FIG. 4 is a block diagram showing the audio data adaptor 100 and the optical disk driver 300, from a recording point of view, in more detail. The audio data adaptor 100 of FIG. 4 includes an A/D converter 10 for digitizing inputted an analog audio signal; a switch 20 for selecting one of the digitized audio data and digital audio data streams provided from an external source; an audio format converter 30 for converting the selected audio data into data streams of a predetermined audio recording format; and an ATAPI interface 40 for transferring the format-converted audio data streams to the optical disk driver 300 through a IDE bus 102 in accordance with the ATAPI protocol when a command is received.

The optical disk driver 300 of FIG. 4 includes of an ATAPI interface 304 for connecting with the IDE bus 102 according to the ATAPI protocol; a digital recording signal processor 310 for converting digital audio data streams received through the ATAPI interface 304 into data frames of error-correctable format by adding error correction codes; a channel bit encoder 320 for encoding the data frames into eight-to-fifteen-modulated (EFM) bit streams; a writing power driver 330 for outputting a driving current whose intensity is proportional to the bit level; a pickup 331 for making a laser beam be incident to the optical disk 1 according to the driving current; a driver 360 for moving the pickup 331 and driving motors; a servo unit 350 for applying an adjusting signal to the driver 360 on the basis of a tracking error signal, a focussing error signal, and the rotation speed of the optical disk 1; and a microcomputer 340 for performing data transferring through the IDE bus by controlling the internal elements of the adaptor 100 and the disk driver 300.

Figure 5:
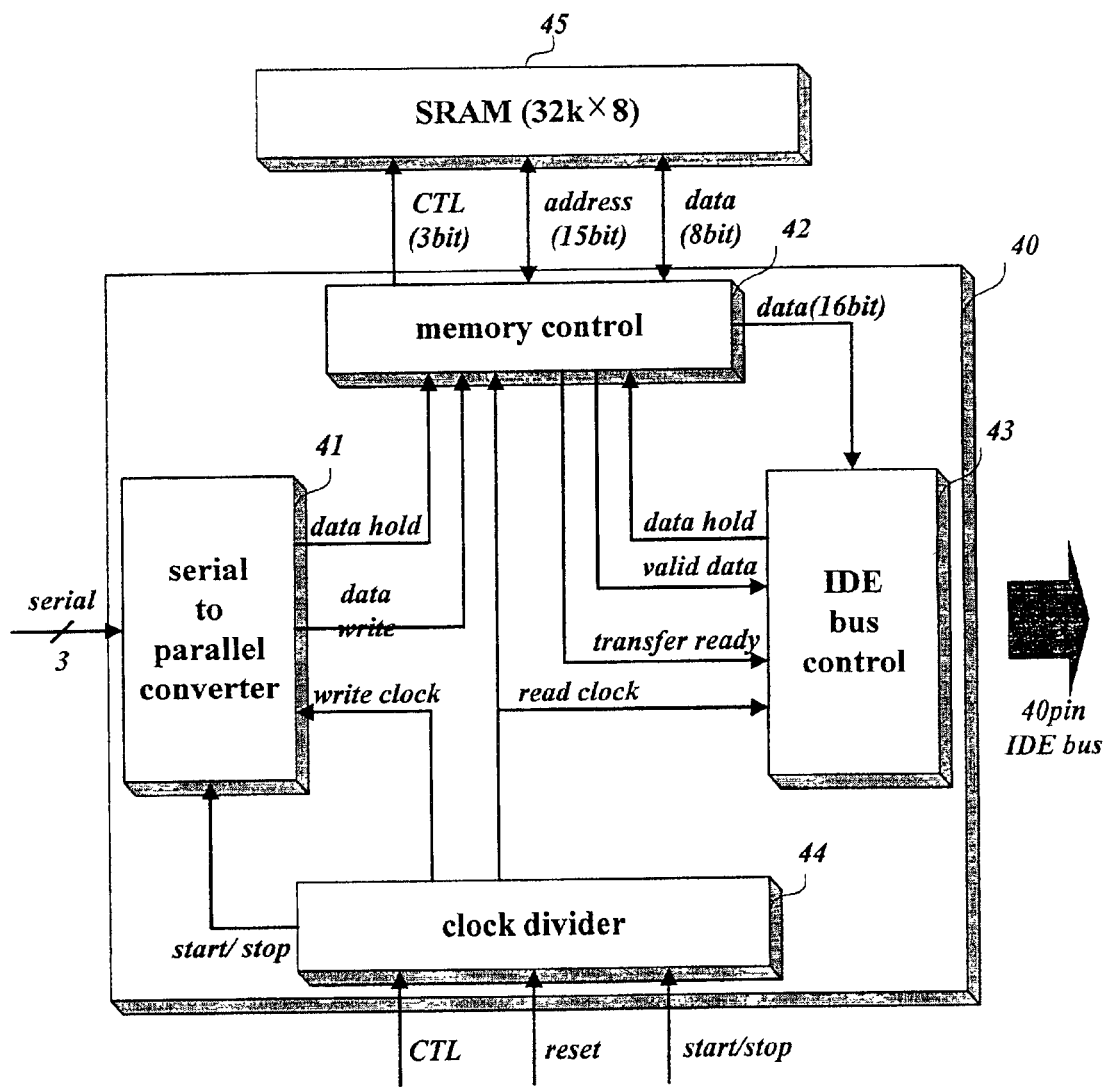
FIG. 5 is a block diagram of an ATAPI interface installed in an audio data adaptor.

FIG. 5 is a detailed block diagram of the ATAPI interface 40 of the audio data adaptor 100, which includes a serial-to-parallel converter 41, a memory control 42, a bus control 43, and a clock divider 44.

Figure 6:
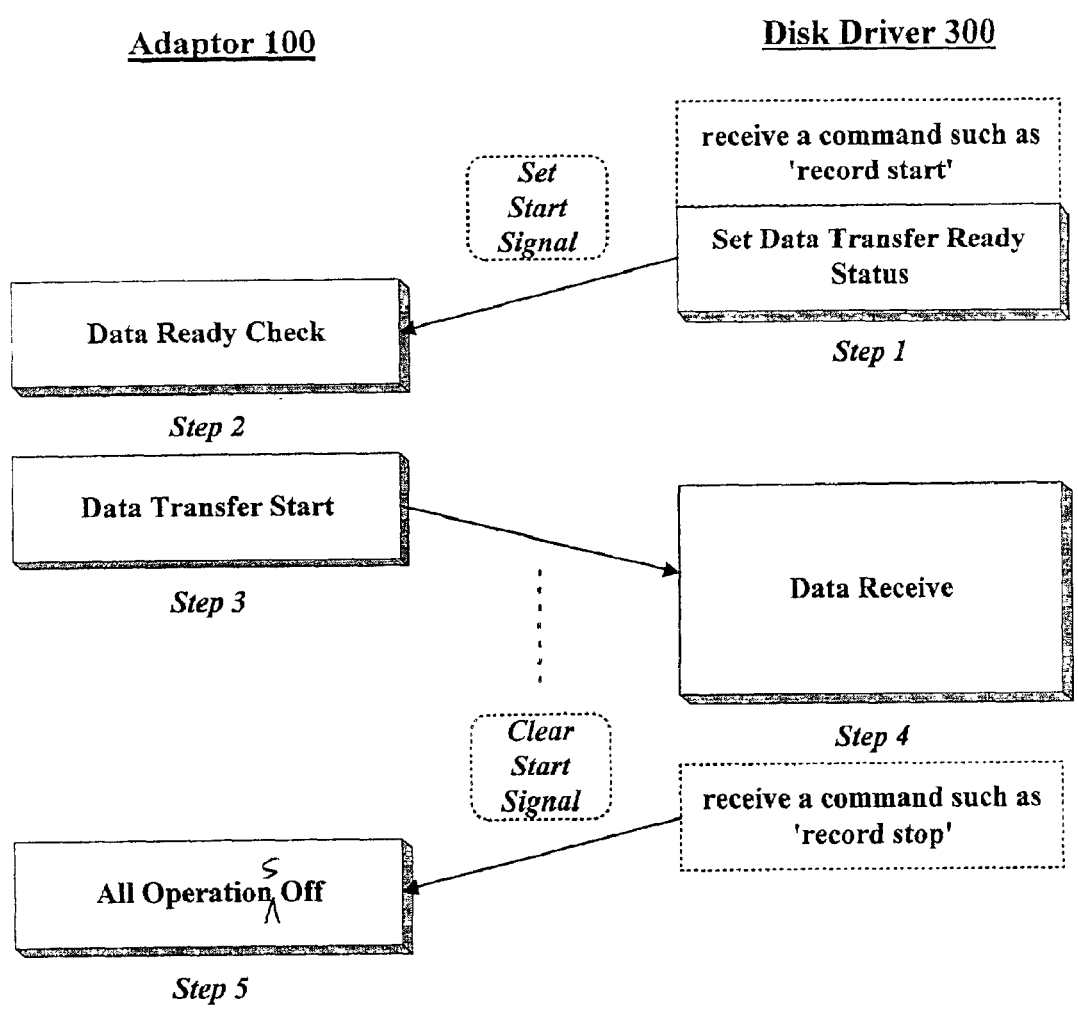
FIG. 6 is a data transfer protocol of the present invention applied to an audio data recorder.

FIG. 6 shows data transferring procedures implemented by the audio data recorder according to the present invention. The data transferring procedures of FIG. 6, as carried out by the audio data recorder depicted in FIG. 4 and FIG. 5, will be explained in detail below.

First, an optical disk 1 for audio recording is inserted into the optical disk driver 300 for recording audio data received through the IDE bus 102. When a record start key is entered, the microcomputer 340 transmits a 'conversion start' signal to the audio format converter 30 through a signal line (not shown in FIGS. 4 and 5) that is different from the IDE bus 102. At the same time, the microcomputer 340 sets a 'START' signal to the ATAPI interface 40 of the audio data adaptor 100 through the bus 102 by controlling the ATAPI interface 304 of the optical disk driver 300 (Step 1). As shown in FIG. 6, the 'START' signal is set directly without intermediate steps such as the bus checking and occupation steps, and a communication standby mode which require interchange of packet commands. The audio format converter 30 converts the received audio signal into record-formatted data as soon as the 'conversion start' signal is received. After detecting the setting of the 'START' signal, the ATAPI interface 40 continuously checks whether the format-converted data are received and whether transmission is possible (Step 2).

Meanwhile, the microcomputer 340 enables the A/D converter 10 of the audio data adapter 100 to digitize an input signal, and controls the switch 20 to select an audio signal source among audio signal sources provided from external devices based upon a user's choice. The switch 20 connects an audio signal at input terminal 'a' to the output terminal 'c' if a user selects an analog signal source, and connects an audio signal at input terminal 'b' if a user selects a digital signal source.

If an analog signal is inputted, the A/D converter 10 digitizes the analog signal into digital data by sampling the analog signal at 44 kHz. The switch 20 selects the digitized audio data if an analog signal source is selected, and selects digital audio data streams inputted directly from an external device through the I/O port 200 if a digital signal source is chosen by a user. The audio format converter 30 converts the digital audio data from the switch 20 into audio data streams of a pre-determined audio recording format, for example, the layer3 standard of MPEG1, after examining the format of the selected digital audio data and activating the corresponding format converting routine.

While the ATAPI interface 40 continuously checks whether any data to be transmitted is received (Step 2), if a data to be transmitted is outputted in serial format from the audio format converter 30, the ATAPI interface 40 conducts a transmission of the received data immediately (Step 3) because the 'START' signal in the bus has been set, of which the detailed process is as follows.

Referring to FIG. 5, at first, the serial-to-parallel converter 41 of the ATAPI interface 40 converts the serial bits from the audio format converter 30 into 8-bit parallel data, and outputs the 8-bit parallel data to the memory control 42 together with a data writing signal synchronized with a writing clock of the clock divider 44, which generates all clock signals necessary for data transfer. The above operation is performed whenever the 'START' signal in the bus is cleared.

The memory control 42 stores 8-bit data in the memory (SRAM) 45 whenever the data writing signal is applied from the serial-to-parallel converter 41, and increases a writing address whenever data is stored. When the increased address reaches a limit address during the storing process, the memory control 42 transmits a 'transfer-ready' signal to the bus control 43, and activates a data-valid signal if a data-hold signal is deactivated. The data-hold signal becomes activated by the bus control 43 if the 'START' signal in the IDE bus has been set, and becomes deactivated if the 'START' signal is cleared. Accordingly, the data is transferred through the IDE bus 102 according to the following process if the 'START' signal in the bus is set.

When the 'transfer ready' signal and the data-valid signal are activated, the data addressed by the memory control 42 are retrieved one by one, and then packed into 16-bit parallel data which are applied to the bus control 43 in accordance with a data reading clock of the clock divider 44. At the same time, the memory control 42 increases the address of a read pointer. The bus control 43 transmits the read 16-bit data to the optical disk driver 300 through the IDE bus 102.

If the data writing signal is applied to the memory control 42, again during the above process, the memory control 42 releases the activated valid-data signal, and conducts the data storing process explained above after changing the data reading address to the data writing address.

The above data retrieving process of the memory control 42 shall be continued until data of desirable size are retrieved for a single; transmission. After the last data is read out, the memory control 42 releases the activated 'transfer ready' signal and the valid-data signal at the same time.

If the counter portion of the ATAPI interface 304 is delayed in data receiving during data transmission through the IDE bus 102, the bus control 43 temporarily interrupts the data transmitting process by sending a data-hold signal to the memory control 42, and when the delay condition is resolved, the data-hold signal is released so that the data transmission restarts.

According to the data transferring through the IDE bus connected to the ATAPI interfaces 40 and 304, the ATAPI interface 304 of the optical disk driver 300 receives record-formatted audio data in accordance with the same protocol (Step 4). The optical disk driver 300 records the audio data received through the ATAPI interface 304 as explained below.

When the record-formatted audio data are applied to the digital recording signal processor 310 through the interface 304, the digital recording signal processor 310 reconstructs the received data into error correction code (ECC) blocks to enhance data reliability by adding error correction parities and rearranging data. The channel bit encoder 320 generates a 15-bit modulated code, which is adequate for optical recording, for each 8-bit data outputted from the digital recording signal processor 310, and then applies the modulated code to the writing power driver 330.

The writing power driver 330 having been adjusted to output optimal writing power by the microcomputer 340, generates a driving current whose magnitude is determined depending upon the binary level of codes. Driven by the driving current, the pickup 331 records the modulated codes in the program area of the optical disk 1 by making an internal laser beam be incident on the surface of the disk 1. Thereby, the audio signal provided from another device is recorded on the optical disk.

If a record stop operation is requested to the microcomputer 340 during the recording of audio signals, the microcomputer 340 releases the activated 'conversion start' signal and deactivates the 'START' signal in the bus 102 by controlling the ATAPI interface 304 at the same time, for interrupting the data transmission. Accordingly, the audio format converter 30 of the audio data adapter 100 immediately stops converting the received data and the ATAPI interface 40 also stops transferring the converted data through the IDE bus (Step 5). That is, the data communication mode of the IDE bus 102 is stopped and the data transferring and recording is terminated.

The method and apparatus according to the present invention transfers real-time data such as an audio signal with no delay to a general optical disk driver satisfying the personal computer bus interfacing requirements, making it possible to use a general disk driver for a data recording means instead of an exclusive audio disk driver, thereby reducing manufacturing costs of a digital audio recorder and enabling the disk driver installed in a digital audio recorder to be used in other devices such as a PC.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An audio data receiving apparatus, comprising:
   a converter converting a digital audio signal, input from a source external to the audio data receiving apparatus, into record-formatted audio data; and
   an interface receiving the record-formatted audio data from said converter, and transferring, via a bus, the record-formatted audio data to a disk recording/reproducing device without conducting a preparation process for transferring data when a record request is received from the disk recording/reproducing device, wherein the preparation process is specified in a bus standard protocol for a personal computer.

2. The apparatus set forth in claim 1, wherein said bus standard protocol is AT Attachment Packet Interface (ATAPI) protocol.

3. The apparatus set forth in claim 1, further comprising a sampler converting an analog audio signal into the digital audio signal.

4. The apparatus set forth in claim 1, wherein said interface comprises:
   a serial-to-parallel converter converting the record-formatted serial data into 8-bit parallel data and outputting 8-bit parallel data with a data writing pulse;
   a memory controller sequentially storing the 8-bit parallel data in a memory whenever the data writing pulse is received, and retrieving the stored 8-bit parallel data as 16-bit parallel data and simultaneously generating a transfer-ready signal when a predetermined amount of 8-bit parallel data has been stored in the memory; and
   a transmitter transmitting the 16-bit parallel data to the disk recording/reproducing device through the bus when the transfer-ready signal is received.

5. An audio data recording apparatus, comprising:
   a connector sending/receiving signals through a bus in accordance with a bus protocol compatible with a bus protocol specified for use in a personal computer;
   a recorder modulating audio data received through said connector into recording signals and recording the recording signals in a recording medium; and
   a controller controlling the connector to transmit a transfer start signal to a counter part of the bus without sending/receiving packet commands through the bus when a record command is received.

6. The apparatus set forth in claim 5, wherein said bus protocol is AT Attachment Packet Interface (ATAPI) protocol.

7. The apparatus set forth in claim 5, wherein said controller changes a binary level of the transfer start signal for the counter part to start data transfer.

8. The apparatus set forth in claim 7, wherein said controller restores the binary level of the transfer start signal when a record stop is requested.

9. A method for sending/receiving audio data through a bus, comprising the steps of:
   (a) entering into a data communication mode without conducing a preparation process for transferring data over a bus when a record request is received, wherein the preparation is specified in a bus standard protocol for a personal computer, and includes occupying a bus and issuing packet commands;
   (b) sending/receiving audio data in the data communication mode; and
   (c) stopping the data communication mode when a recording stop request is received.

10. The method set forth in claim 9, wherein said step (a) includes transferring, from a receiving part to a data transferring part, via the bus, a transfer start signal without conducting the preparation process when the record request is received.

11. The method set forth in claim 10, wherein said step (c) discontinues transfer of the transfer start signal.

12. The method set forth in claim 9, further comprising:
   (d) interrupting a data transfer operation over the bus in the data communication mode when the step (c) stops the data communication mode.

13. The method set forth in claim 9, wherein the packet commands are specified in the AT Attachment Packet Interface (ATAPI) protocol.

14. The method set forth in claim 9, wherein said step (a) simultaneously transmits a transfer start signal and a command requesting start of format conversion of a received audio signal from a data receiving part to a data transferring part.

15. A method for sending/receiving data between two devices through a bus, comprising the steps of:
   (a) simultaneously transferring a transfer start signal and a conversion start signal to a data transfer device without conducting a preparation process for transferring data when a record request is received, wherein the preparation process is specified in a bus standard protocol for a personal computer and includes occupying the bus and issuing packet commands;
   (b) converting an input signal into data streams of predetermined format when the data transfer device receives the conversion start signal;
   (c) checking whether the transfer start signal is received when a predetermined number of data streams are generated; and
   (d) transferring the data streams to a receiving device through the bus when said step (c) indicates the transfer start signal has been received.

16. The method set forth in claim 15, wherein the bus is compatible with the AT Attachment Packet Interface (ATAPI) bus.

17. The method set forth in claim 15, wherein said step (a) sends the transfer start signal via the bus and sends the conversion start signal through a signal path different from the bus.

18. The method set forth in claim 15, further comprising:
   (e) receiving the transferred data through the bus; and
   (f) recording the received data.

* * * * *